United States Patent [19]

Fischer et al.

[11] Patent Number: 5,066,267

[45] Date of Patent: Nov. 19, 1991

[54] TRANSMISSION HAVING AN ECCENTRIC AND A CYCLOID GEARING

[75] Inventors: Florian Fischer, Ebersberg; Christian Ritzer, Unterhaching, both of Fed. Rep. of Germany

[73] Assignee: Messerschmitt-Bölkow-Blohm GmbH, Fed. Rep. of Germany

[21] Appl. No.: 596,717

[22] Filed: Oct. 10, 1990

[30] Foreign Application Priority Data

Nov. 15, 1989 [DE] Fed. Rep. of Germany ....... 3937909

[51] Int. Cl.$^5$ .............................................. F16H 1/28
[52] U.S. Cl. .................................... 475/168; 475/174; 475/177
[58] Field of Search ............... 475/162, 168, 174, 176, 475/177, 178

[56] References Cited

U.S. PATENT DOCUMENTS

| | | | |
|---|---|---|---|
| 4,567,790 | 2/1986 | Butterfield et al. | 475/168 |
| 4,898,065 | 2/1990 | Ogata et al. | 475/178 X |
| 4,909,102 | 3/1990 | Haga | 475/168 |

FOREIGN PATENT DOCUMENTS

| | | |
|---|---|---|
| 1575003 | 2/1970 | Fed. Rep. of Germany . |
| 2433675 | 7/1981 | Fed. Rep. of Germany . |
| 3206992 | 9/1983 | Fed. Rep. of Germany . |
| 203250 | 11/1983 | Japan ................................. 475/178 |
| 1202928 | 8/1970 | United Kingdom . |

Primary Examiner—Dwight Diehl
Attorney, Agent, or Firm—Evenson, Wands, Edwards, Lenahan & McKeown

[57] ABSTRACT

A transmission for driving a swivel joint between two elements which are rotatable relative to each other. Cam disks are moved by means of a multiple eccentric, each such cam disk having an outer edge in the form of a closed cycloidal path and being arranged so that it can be rolled off in a central wheel in a positive engagement with a gearing formed by pins or the like. A driving element engages by means of driving pins, with the cam disks by way of bores arranged being in it, the driving element being subdivided into two driving disks which, are spaced from one another and from the cam disks at a distance of at least the central wheel and are combined by means of the driving pins, the driving disks and the central wheel being rotatably movable relative to one another.

11 Claims, 2 Drawing Sheets

TRANSMISSION HAVING AN ECCENTRIC AND A CYCLOID GEARING

BACKGROUND AND SUMMARY OF THE INVENTION

The invention relates to a transmission for driving a swivel joint between two elements which are rotatable relative to each other.

Cycloid transmissions of the generic type, such as disclosed, for example, in German patent document DE-OS 34 18 686, are normally used for the rotational-speed gearing between two shafts, particularly if high gear ratios are required. In this case, a multiple eccentric is usually coupled to a drive shaft, and the driving element is coupled to an output shaft. For generating high rotational speeds, the driving shaft and the output shaft may also be interchanged. It is also possible to use such a transmission, in a simplified construction such as disclosed in German patent document DE-OS 34 07 245 for example, as a torque wrench, in which case a drive shaft and an output shaft are also necessary. A further example of a transmission of the type initially mentioned above is disclosed in German patent document DE-OS 32 06 992, in which for the support of the driving pins on both ends, driving disks are arranged at both sides of the cam disks (cycloid disks), and these two driving disks, at their outer circumference, are at the same time used for the (radial and axial) bearing of the "roller ring" central wheel, specifically with the insertion of separate bearings. In this case, the driving disks are stationary transmission parts, either with respect to a stationary frame (such as the vehicle frame) or with respect to a moving output shaft, the "roller ring" central wheel carrying out the function of either the output shaft or of the transmission "frame ring" central wheel carrying out the function of either the output shaft or of the transmission frame.

It is an object of the invention to provide a transmission of the generic type which is adapted to be used as a joint between components that can be swivelled relative to one another, this joint being operable by means of a single shaft.

This object is achieved according to the invention, by fixing the driving disks in a stationary position so that, when the multiple eccentric is rotated, the cam disks are driven by way of the driving pins, thus causing the central wheel to rotate. As an alternative, it is also possible in the case of a transmission according to the invention, to lock the central wheel instead of the driving disks so that, when the multiple eccentric is driven, the cam disks are driven by the central wheel thereby causing the driving disks to rotate. As a result, the transmission may be used as a swivel joint between a component fixedly connected with the central wheel and a component fixedly connected with the driving disks, in which case, when the multiple eccentric is driven by a shaft or the like, one (locking) component remains stationary, and the other component is swivelled by the central wheel or the driving disks depending on the assignment.

An advantage of the transmission according to the invention is that, a compact construction is ensured, in which neither the bearing devices nor the locking devices of the driving disks and of the central wheel require a lot of space. Thus, no separate bearing is required for the radial support of the central wheel. Consequently, this transmission is suitable for all applications of a swivel joint with a relatively low space requirement while the stability under load is high.

Other objects, advantages and novel features of the present invention will become apparent from the following detailed description of the invention when considered in conjunction with the accompanying drawings.

DETAILED DESCRIPTION OF THE DRAWINGS

Figure 1:
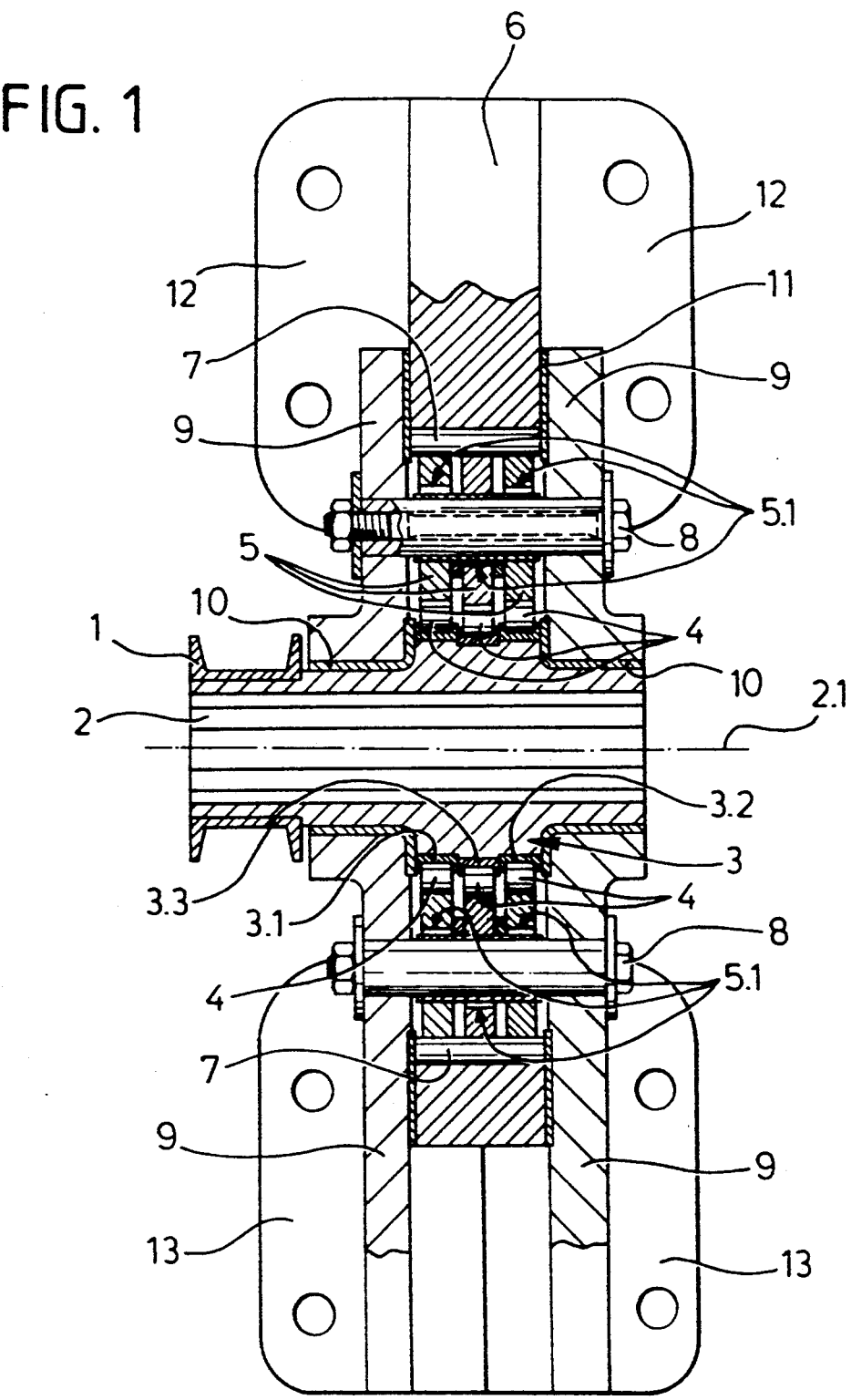
FIG. 1 is a longitudinal sectional view of a transmission according to the invention which can be used as a swivel joint.
Figure 2:
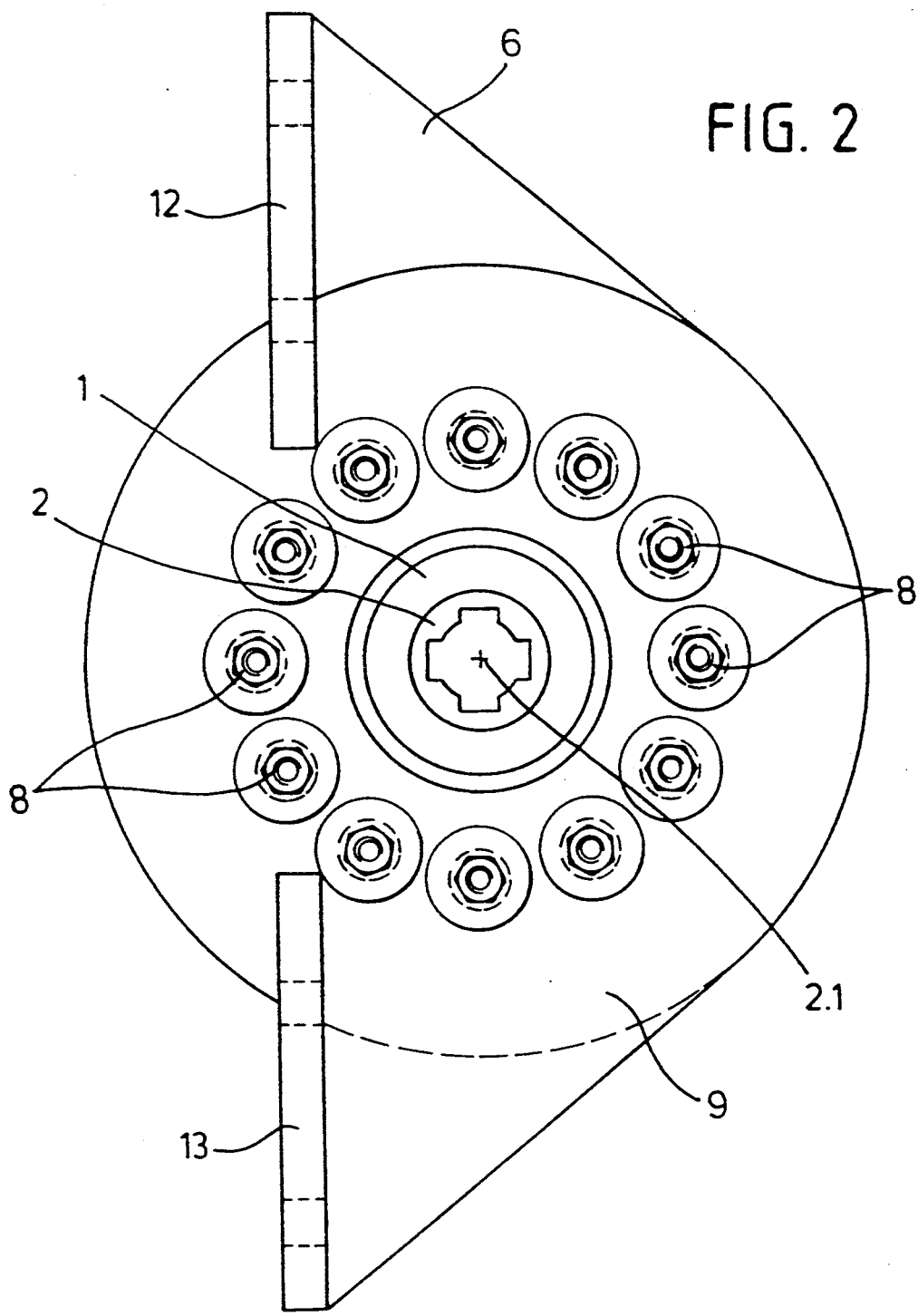
FIG. 2 is a view of the transmission according to FIG. 1 on the drive side.

According to FIG. 1, the driving of the transmission takes place by way of a drive shaft 2 which can be rotated, for example, by means of a pulley 1. Drive shaft 2 is constructed as an eccentric shaft having a multiple eccentric 3, for example, with three running paths 3.1, 3.2 and 3.3 which each have the same amount of eccentricity and are offset with respect to one another by 120° respectively. Cam disks 5 are disposed on the running paths 3.1, 3.2 and 3.3 of the eccentric by way of roller bodies 4. The outer edges of these cam disks 5 each have the shape of a closed cycloidal path by means of which the cam disks 5 are in a positive engagement with a central wheel 6, specifically by way of a gearing of the central wheel 6 which is formed by an outer ring, for example, of pins 7, which is concentric to the axis of rotation 2.1 of the drive shaft 2. Each individual cam disk 5 is provided with a ring of bores 5.1 which is also concentric to such axis of rotation, and into which driving pins 8 engage. As depicted in FIG. 2, these driving pins 8, form an inner ring which is similarly concentric with respect to the axis of rotation 2.1 of the drive shaft 2.

Transmission construction of this generic type is well known in principle (DE-PS 2433675), so that the operation of the cam disks 5 does not have to be described in detail. In order to be able to carry out the function of a highly-loadable swivel joint, for example, between a stationary component (such as a helicopter airframe) and a component that can be swivelled with respect to it by a certain angle (such as a tail boom), the driving pins 8 are connected to a driving element comprising two driving disks 9 which are disposed on the drive shaft, preferably by means of a space-saving slide bearing 10. In this case, the driving disks 9 are spaced away from one another as well as with respect to the cam disks 5 by means of at least the central wheel 6. By providing two driving disks 9, which are combined into one driving element by way of the driving pins 8, support of the driving pins 8 free of reversed bending stress is ensured. In addition, the driving disks 9 and the central wheel 6 remain rotatable with respect to one another, for the purpose of which the surfaces of the driving disks 9 facing the latter are preferably constructed as slide bearings 11. The locking of either the driving disks 9 or the central wheel 6 by means of a rigid connection with a stationary component (not shown) thus results in swiveling of the unlocked central wheel 6, or if it is locked, the unlocked driving disks 9, and thus a movable component (not shown), by rotating pulley 1 on drive shaft 2. For the connection with the two components, the central wheel 6 and the driving disks 9 are provided with connecting devices 12 and 13, preferably molded-on screw flanges, in which case, according to FIG. 1, those of the driving disks 9 are divided for mounting purposes. In the case of, for example, a stationary arrangement of the connecting devices 13 of the driving disks 9, the sequence of movements takes place such that a rotating movement of the pulley 1 and thus of the drive shaft 2 as well as of the multiple eccentric 3, in this manner, causes rotating movements of the cam disks 5 which in this case cooperate with driving pin 8 locked by the stationary driving disks 9 and, by way of their cycloidal outer edges, to swivel the central wheel 6 with the component assigned to its connecting device by a desired angle.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A transmission for driving a swivel joint between two parts which are rotatable relative to each other, comprising a drive shaft having a multiple eccentric, cam disks driven by said multiple eccentric, each having an outer edge in the form of a closed cycloidal path and being disposed in driving engagement with gearing of a central wheel, a driving element subdivided into two driving disks and engaging by means of driving pins with said cam disks by way of bores therein, wherein the central wheel and the cam disks are arranged between the two driving disks, the driving disks being connected by said driving pins and being arranged so that they can be rotatably moved with respect to the multiple eccentric, the cam disks and central wheel.

2. A transmission according to claim 1, wherein the surfaces of the driving disks which face the central wheel are constructed as slide bearings of the central wheel.

3. A transmission according to claim 1, wherein the driving disks are disposed on a drive shaft carrying the multiple eccentric.

4. A transmission according to claim 3, wherein the driving disks have a slide bearing disposed on the surface facing said central wheel.

5. A transmission according to claim 1, wherein the central wheel comprises means for rigidly fixing it to a reference element.

6. A transmission according to claim 5, wherein said reference element is a stationary element.

7. A transmission according to claim 5, wherein the means for rigidly fixing are molded-on screw flanges.

8. A transmission according to claim 1, wherein the driving disks comprise means for rigid attachment to a reference element.

9. A transmission according to claim 8, wherein said reference element is a stationary element.

10. A transmission according to claim 9, wherein the means for rigidly fixing are molded-on screw flanges.

11. A transmission according to claim 8, wherein the means for rigidly fixing are molded-on screw flanges.

* * * * *